April 6, 1965 W. CULL 3,176,476
UNIVERSAL JOINTS

Filed Dec. 10, 1962 2 Sheets-Sheet 1

INVENTOR
WILLIAM CULL
BY
Irwin S. Thompson
ATTORNEY

April 6, 1965 W. CULL 3,176,476
UNIVERSAL JOINTS
Filed Dec. 10, 1962 2 Sheets-Sheet 2

INVENTOR
WILLIAM CULL
BY
Irvin L. Thompson
ATTORNEY

3,176,476
UNIVERSAL JOINTS
William Cull, Hest Bank, near Lancaster, England, assignor to Birfield Engineering Limited, London, England
Filed Dec. 10, 1962, Ser. No. 243,369
Claims priority, application Great Britain, Dec. 12, 1961, 44,422/61
16 Claims. (Cl. 64—8)

This invention relates to universal joints, and has for its object to provide a constant velocity universal joint of the ball type which is capable of accommodating relative axial movement or "plunge" of shafts coupled together by the joint.

Constant velocity joints of the ball type normally comprise inner and outer members, alternatively providing the driving and driven members of the joint, coupled by a series of balls forming intermediate members engaging registering grooves in the members. Thus the balls transmit the torque and, by rolling along the grooves, allow relative angular movement of the driving and driven members while the joint is in use. Guide means are commonly provided to ensure that the coupling balls remain in the median plane of the joint, which is a necessary condition if the joint is to have true (or substantially true) constant velocity characteristics. The median plane is the plane passing through the joint center and bisecting the angle between the axes of the driving and driven members.

According to the invention a universal joint comprises a longitudinally grooved outer member and a grooved inner member which is centered within a hollow carrier member from which intermediate torque-transmitting balls coupling the members project to engage corresponding grooves in the two members, the carrier also housing guide means for the balls and being arranged to slide within the outer member to accommodate "plunge."

The carrier member is preferably in the form of a sleeve-like member which surrounds the inner member and has a wall with elongated through apertures within which the balls are positioned.

The balls may directly engage the guide means and in this case the carrier member is conveniently formed with part-spherical internal surfaces between the ball apertures, these surfaces engaging complementary surfaces on the inner member to center the latter. Alternatively, a ball cage may be provided movement of which is controlled by the guide means and in this case the cage preferably has outer and inner part-spherical surfaces respectively engaging complementary surfaces in the carrier member and on the inner member to center the inner member within the carrier member.

The invention will now be further described with reference to the accompanying drawings which illustrate, by way of example, four constant velocity joints capable of accommodating plunge and formed in accordance with the invention. In the drawings.

Figure 1:
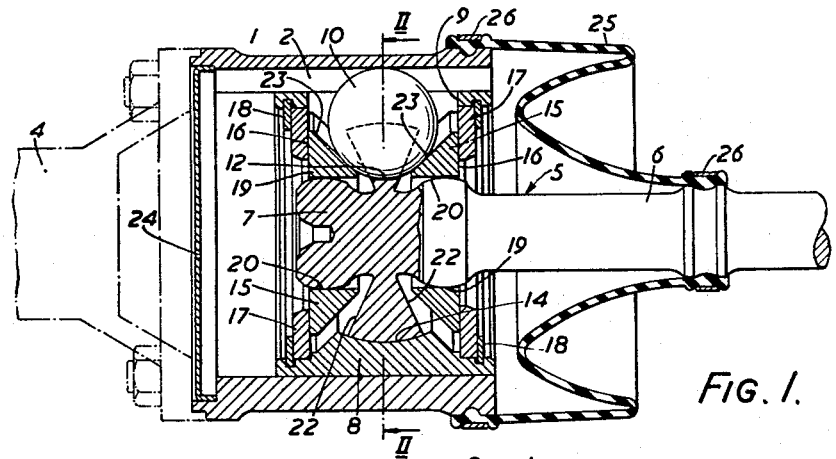
FIGURE 1 is an axial sectional view of one of the joints.
Figure 2:
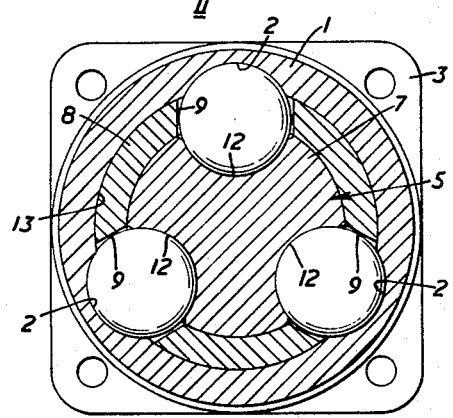
FIGURE 2 is a sectional view on the line II—II in FIGURE 1.

Referring to FIGURES 1 and 2, the joint illustrated therein has a hollow generally cylindrical outer member 1 which is formed internally with three longitudinally extending grooves 2. At one end the outer member 1 is formed with a flange 3 for bolting to a flanged shaft shown in broken lines at 4, and a ball-ended inner member 5 has a shaft portion 6 which projects from the other and open end of the outer member 1. The ball end 7 of the inner member 5 is centered within a carrier member 8 which slides in a piston-like manner within the outer member 1 to accommodate plunge.

The carrier member 8 has a side wall with three through apertures 9 within which are positioned three equiangularly arranged torque-transmitting balls 10, each of these balls engaging one of the grooves 2 in the outer member 1 and a corresponding groove 12 in the ball end 7 of the inner member 5.

The carrier member 8 is in the form of a ring with a cylindrical outer surface 13 and, internally between the ball apertures 9, it is formed with part-spherical surfaces 14 which engage the ball end 7 of the inner member 5 after assembly to center that member within the outer member 1. The inner member 5 is also located axially within the carrier 8 by the part-spherical surfaces 14, and two opposed guide rings 15 forming guide means of the joint are respectively arranged on opposite sides of the ring of balls 10.

Each of the guide rings 15 has a plane outer surface 16 which engages the inner surface of a retaining ring 17 fitted in the corresponding end of the carrier member 8 and retained therein by a circlip 18. This enables the guide rings 15 to slide on the retaining rings 17 in lateral planes, i.e. planes at right angles to the longitudinal axis of the carrier member 8, and such sliding movement is produced by engagement of part-spherical guide surfaces 19 on the inner member 5 within central bores 20 in the guide rings 15.

To provide space for the part-spherical surfaces 19 the ball end 7 of the inner member 5 is undercut at 22 from each end, the surfaces 19 respectively being positioned within the undercuts 22 and equally spaced with respect to the plane containing the ball centers. Thus angularity of the outer and inner members 1 and 5 produces equal and opposite movements of the guide rings 15 in the respective planes, and the inner or guide surfaces 23 of the guide rings 15 are shaped so that these movements cause them to engage the balls 10 and guide the latter so that the ball centers always lie in the median plane of the joint. The guide surfaces 23 are substantially frusto-conical in form, although some variation from a true cone shape is in practice necessary to ensure accurate guiding of the balls 10.

The inner ball tracks or grooves 12 in the inner member 5 are of elliptical cross-section, the grooves 2 in the outer member 1 being relatively shallow but of similar cross-sectional shape. The form of the grooves 2 and 12 is chosen to provide a pressure angle of 45°, this being the angle at the center of each ball 10 between a radius, through either of the two points of contact of the ball with the flanks of each corresponding groove 2 or 12, and a line through the ball center and tangential to the pitch circle of the balls; similar conditions apply with the other three joints described hereinafter. In FIGURE 2 the pitch circle would be the circle connecting the centers of the three balls.

The end of the joint adjacent the flange 3 is closed by a pressed-in sealing plate 24, and the other end is sealed by a flexible sealing muff or boot 25 attached by retaining rings 26 to the open end of the outer member 1 and to the shaft portion 6 respectively. The muff 25 retains lubricant within the joint and prevents the ingress of dirt and moisture.

Figure 3:
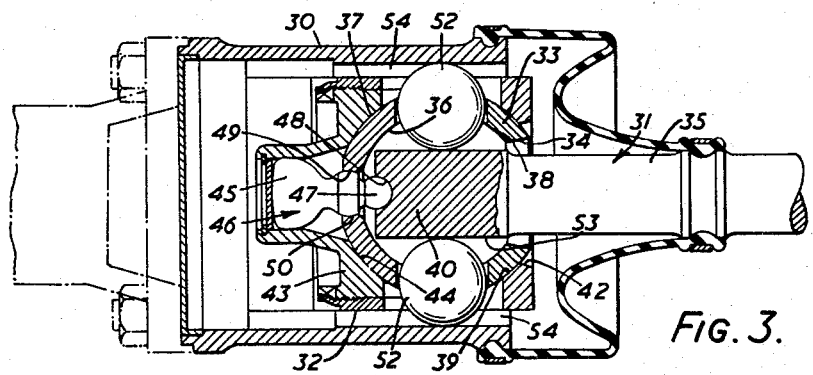
FIGURE 3 is a view similar to FIGURE 1 of another of the joints.

As can be seen in FIGURE 3, the joint illustrated therein has an outer member 30, inner member 31 and carrier member 32 basically of similar shape and function as compared with the corresponding parts of the joint already described.

A split ball cage 33 of generally spherical shape with an aperture 34 through which the shaft portion 35 of the inner member 31 projects has part-spherical inner and outer surfaces 36 and 37 respectively engaging part-spherical surfaces 38 and 39 on the inner member 31 and in the carrier member 32, thereby centering the ball end 40 of the inner member 31. The carrier member 32 has a small diameter opening 42 at the outer end to retain the cage 33 captive, the cage 33 being fitted through the other end opening during assembly, and a retaining ring 43 fitted into the latter end of the carrier member 32 is formed with a part-spherical seating 44 to engage the cage 33 and complete the location of the latter.

The retaining ring 43 houses one end 45 of a centering or ball guide member 46 the other end 47 of which engages a seating 48 in the inner end of the inner member 31. The guide member 46 passes through a guide bore 49 in the cage 33, and at an intermediate position it has a part-spherical guiding surface 50 which engages the guide bore 49 to guide the cage 33; the arrangement is such that movement of the guide member 46 as a result of relative angularity of the outer and inner members 30 and 31 displaces the cage 33 which in turn displaces the balls 52 in a manner such that the centers of the latter remain in the median plane of the joint.

In this case four equiangularly arranged balls 52 are used, with four corresponding grooves 53 and 54 in each of the inner and outer members 31 and 30.

The joint of FIGURE 4 again has four torque transmitting balls 100 and a ball cage 101 which is split circumferentially on the ball centers. Guide means for the balls 100 comprise a guide ring 102 which slides in a lateral plane against a retaining ring 103 screw-threaded into the inner end of the carrier member 104 which again slides in the hollow outer member 105. The guide means also comprise a control member 106 with a part-spherical outer surface 107 which engages a guide aperture 108 in the inner end of the cage 101.

The control member 106 is a sliding fit on a tubular extension 109 of the guide ring 102, and this allows axial movement of the member 106 against a "wavy" spring ring 110 between the guide ring 102 and the control member 106. Sliding movement of the guide means in said lateral plane is produced by an extension 112 at the inner end of the inner member 113, the latter extension having a part-spherical surface 114 engaging a central bore 155 in the extension 119.

Centering of the inner member 113 within the carrier member 104 is again achieved by engagement of part-spherical surfaces 116 and 117 formed respectively on the inner member 113 and the cage 101. Movement of the guide means in response to angularity of the joint acts to center the balls 110 accurately in the true median plane of the joint, and the pressure between the control member 106 and the cage 101 acts at a large pressure angle relative to the surface of the retaining ring 103; the pressure angle is in fact 45° in the condition of zero joint angularity. Modification of the cage 101 and the form of the control member 106 enables the pressure angle to be varied, and a logical development of this leads to the final form of joint illustrated in FIGURE 5.

Figure 5:
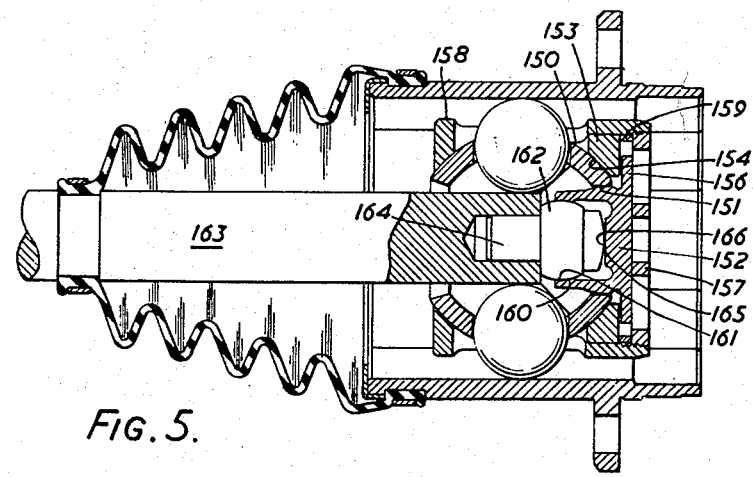
FIGURE 5 is a similar view of the remaining joint.

In the joint of FIGURE 5 the pressure angle has become zero, and this is achieved by extending the inner end of the cage 150 so that the inner end guide aperture 151 therein is a cylindrical bore. As the control member 152 can no longer assist in axial location of the cage 150 a centering ring 153 is provided with an inner part-spherical centering surface 154 which engages the outer surface of the cage 150. As relative axial movement of the control member 152 and guide aperture 151 can now occur within that aperture the guide means can be in one piece, the member 152 having a flange 156 which slides in contact with the retaining ring 157 which again forms a pressure plate screwed into the inner end of the carrier member 158.

A spacer washer 159 between the centering ring 153 and the retaining ring 157 provides the correct clearance for the flange 156 between those rings, the thickness of the washer 159 being chosen to provide the correct sliding fit.

In FIGURE 5 the part-spherical surface 160, which controls movement of the guide means by engaging the bore 161 in the control member 152, is again formed on an inner end extension 162 of the inner joint member 163. In this case, however, the extension 162 is not formed integrally with the member 163 but has a stem 164 which is a press fit in the inner end of that member. As a modification (not illustrated), which avoids the necessity of manufacturing to very fine limits and facilitates assembly, the extension 162 may be made a sliding fit in the inner member 163 and be spring loaded towards the control member 152.

As shown in FIGURE 5, the extension 162 has a part-spherical end surface 165 which engages a flat internal surface 166 on the control member 152. The surface 165 is centered on the joint center so that there is no relative axial movement of the extension 162 and the control member 152 during changing joint angularity, and hence with the spring-loaded modification the spring merely has to compensate for any slight manufacturing inaccuracies which may be present. In the modification the spacer washer 159 can also be dispensed with and the peripheral edge of the centering ring 153 extended to form a recess which is a reasonable clearance fit for the flange 156 which is urged by the spring loading into engagement with the retaining ring 157. In the arrangement as illustrated, however, the thickness of the washer 159 is very important as the flange 156 must slide freely and yet be accurately located in the axial sense between the rings 153 and 157.

Figure 4:
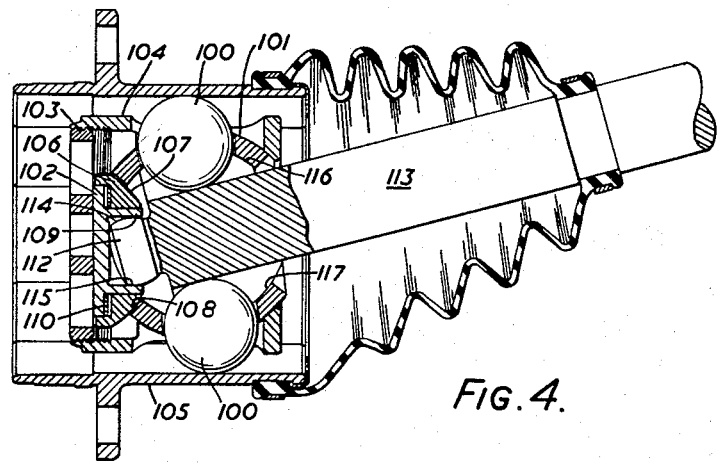
FIGURE 4 is a similar view of another of the joints.

In the foregoing description the arrangements of FIGURES 3 to 5 have been described in less detail than that of FIGURE 1, to avoid unnecessary repetition of basic structural features of the later arrangements which will be entirely clear from the drawings in view of the earlier description in connection with FIGURES 1 and 2.

I claim:

1. A universal joint comprising a cylindrical outer member having longitudinal grooves, and a part-spherical inner member having grooves, said grooves cooperating and forming tracks in which torque-transmitting balls are located so as to permit both articulating and relative longitudinal movement between the inner and outer members, a carrier having an external part-cylindrical surface forming a substantial contact area with the internal surface of said outer member so as to slide thereon in coaxial alignment, said carrier also having a part-spherical internal surface concentric with and surrounding said inner member and an abutment surface transverse to the longitudinal axis of said carrier, and including guide means for locating the balls in the median plane of the joint through the joint pivoting center, said guide means including a member engaging said abutment surface on the carrier.

2. A universal joint according to claim 1, wherein the carrier member is in the form of a sleeve-like member which surrounds the inner member and has a wall with elongated through apertures within which the balls are positioned.

3. A universal joint according to claim 1, wherein the carrier has two parallel axially spaced abutment surfaces and the guide means comprise spaced guide rings between which the balls are positioned and which are formed with guide surfaces engaged by the balls, the guide rings being mounted for sliding movement in parallel planes laterally of the joint axis in contact respectively with said parallel abutment surfaces on the carrier member.

4. A universal joint according to claim 3, wherein each of the guide rings has a central bore engaged by a corresponding guide surface on the inner member, so that changing angularity of the joint produces equal and opposite movements of the guide rings in said parallel planes.

5. A universal joint according to claim 3, wherein the said two abutment surfaces are provided on retaining rings fitted in the ends of the carrier member.

6. A universal joint according to claim 1, wherein a ball cage is provided the movement of which is controlled by the guide means to position the balls correctly.

7. A universal joint according to claim 6, wherein the cage has outer and inner part-spherical surfaces respectively engaging the complementary part-spherical surfaces in the carrier member and on the inner member to center the latter member within the carrier member.

8. A universal joint according to claim 7, wherein an elongated guide member passes through and engages a guide bore in the cage, the guide member being aligned with the joint axis in the condition of zero angularity and located at one end relatively to the carrier member and at the other end in the inner member.

9. A universal joint according to claim 6, wherein the guide means slide on said abutment surface in a plane disposed laterally of the joint and engage a guide aperture in the ball cage.

10. A universal joint according to claim 9, wherein an extension of the inner member engages a bore in the guide means to produce sliding movement of the latter during changing angularity of the joint.

11. A universal joint according to claim 10, wherein said extension is fixed in the inner member.

12. A universal joint according to claim 10, wherein the guide means comprise a laterally slidable guide ring engaged by said extension and on which is mounted an axially slidable spring-loaded control member which engages the guide aperture in the ball cage.

13. A universal joint according to claim 9, wherein the guide means comprise a control member which is laterally slidable on said abutment surface and axially located, the control member engaging the guide aperture in the cage, within which said control member can slide in the axial direction.

14. A universal joint according to claim 13, wherein the control member has a flange which is laterally slidable and axially located between a centering ring and a retaining ring fitted in the carrier member.

15. A universal joint according to claim 1, wherein the ball grooves in the inner and outer members are of elliptical form in cross-section.

16. A universal joint according to claim 15, wherein the elliptical form of the grooves is such as to provide a pressure angle of 45° wherein said pressure angle is defined by the intersection of a line through the center of a ball from a point of pressure contact of the ball with a groove and another line through the center of the ball tangential to the pitch circle of the balls.

References Cited by the Examiner
UNITED STATES PATENTS

| | | | |
|---|---|---|---|
| 2,313,279 | 3/43 | Suczek | 64—21 |
| 2,352,776 | 7/44 | Dodge | 64—21 |
| 2,615,317 | 10/52 | Rzeppa | 64—21 |
| 2,911,805 | 10/59 | Wildhaber | 64—21 |
| 3,041,858 | 7/62 | Wildhaber | 64—21 |

FRANK SUSKO, *Primary Examiner.*